May 12, 1970     S. FEHRENBACH ET AL     3,511,270
PRESSURE CONTROL VALVE
Filed Sept. 11, 1968
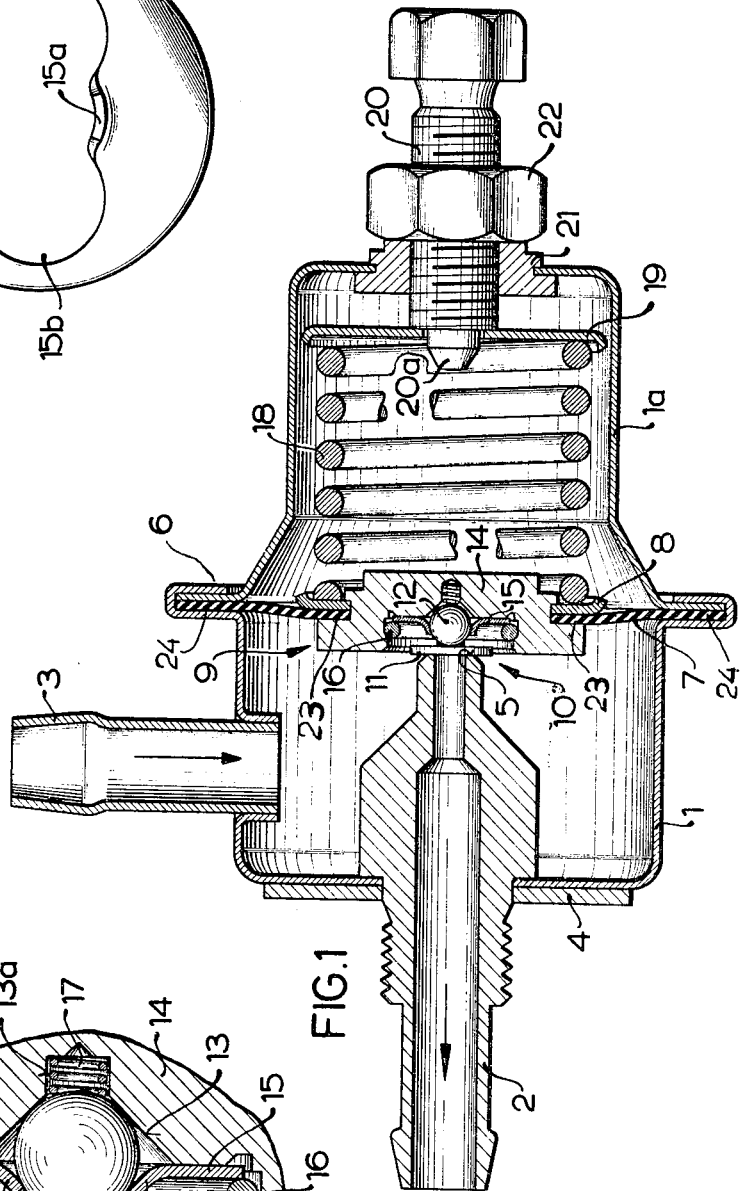
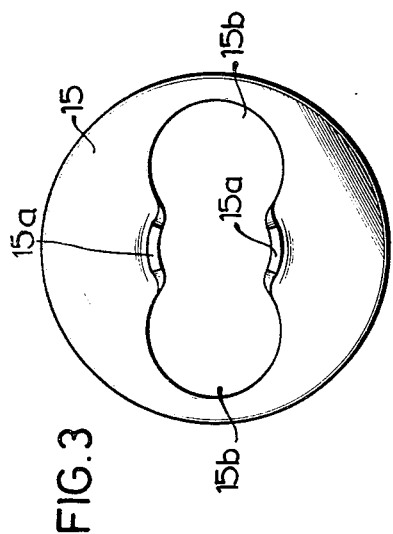
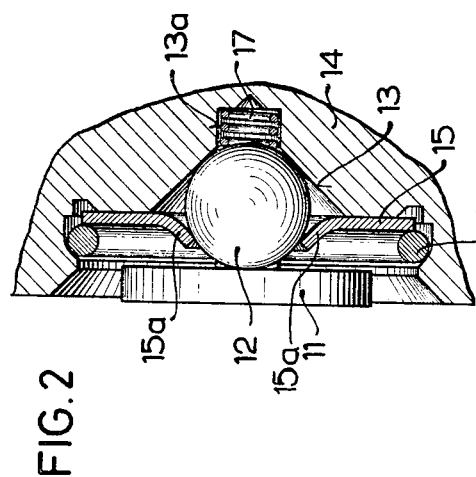
INVENTORS
SIEGFRIED FEHRENBACH
Willi MÜLLER
Karl-Heinz SCHNEIDER
By
*Edwin E. Greigg*
their ATTORNEY United States Patent Office 3,511,270
Patented May 12, 1970

3,511,270
PRESSURE CONTROL VALVE
Siegfried Fehrenbach, Stuttgart-Botnang, Willi Müller, Bad Mergentheim, and Karl-Heinz Schneider, Sonthofen, Germany, assignors to Robert Bosch GmbH, Stuttgart, Germany
Filed Sept. 11, 1968, Ser. No. 758,952
Claims priority, application Germany, Sept. 14, 1967, B 94,455
Int. Cl. F16k 25/00
U.S. Cl. 137—510                                    10 Claims

ABSTRACT OF THE DISCLOSURE

A pressure control valve inserted in a conduit to maintain a constant pressure of the fluid therein; said valve has a movable valve disc which together with a stationary valve seat defines a variable cross-sectional area of a flow passage. The valve disc is rigidly secured to a ball which is swivelably retained in a holder which, in turn, is attached to a membrane. An adjustable spring urges the holder towards the valve seat.

BACKGROUND OF THE INVENTION

The invention relates to a pressure control valve having a valve member and a valve seat that define a variable cross-sectional area of a flow passage. The valve member is suspended from a membrane that is large with respect to said area. A valve of this type is described in German Pat. No. 329,276.

OBJECTS AND SUMMARY OF THE INVENTION

An object of the invention is to provide an improved pressure control valve in a fluid conduit for maintaining upstream of the valve an as closely constant pressure as possible which is independent of the flow rate of the fluid.

It is a further object of the invention to provide an improved pressure control valve which is simple and economical to manufacture and which, even in case of the smallest flow rate, has a constant, very small $\Delta p{:}\Delta Q$ (control characteristics) ratio.

The valve according to the invention is advantageously used in fuel lines forming part of a suction pipe low pressure fuel injection system associated with internal combustion engines.

Briefly stated, in order to achieve the aforenoted objects, there is provided a valve member which includes a valve disc and a ball rigidly secured thereto and swivelably retained in a holder which, in turn, is affixed to a flexible membrane. The membrane serves as a support for the valve member, while the valve disc and a stationary valve seat together define a variable cross-sectional area of a flow passage.

The invention will be better understood as well as further objects and advantages will become more apparent from the ensuing detailed specification of a preferred, although exemplary, embodiment of the invention taken in conjunction with the drawings.

BRIEF DESCRIPTION OF THE DRAWINGS

FIG. 1 is an enlarged, axial, sectional view of the pressure control valve;

FIG. 2 is a further enlarged view of one part of FIG. 1; and

FIG. 3 is a similarly enlarged plan view of an element shown in FIG. 2.

DESCRIPTION OF THE PREFERRED EMBODIMENT

Turning now to FIG. 1, the pressure control valve shown therein comprises a cylindrical sheet metal housing formed of parts 1, 1a, to which there are secured an axially aligned outlet nipple 2 and a radially disposed inlet nipple 3. The outlet nipple 2 is fixedly secured to a frontal face of housing part 1 reinforced by a plate 4. The inner terminal portion of the outlet nipple 2 forms a valve seat 5. The two housing parts 1, 1a are secured to one another by means of a crimped flange 6 which also serves as a clamp for a tensioned membrane 7 extending within and across the housing normal to the longitudinal axis thereof.

The membrane 7 is provided with a large central opening, the marginal circumferential portion of which is clamped by means of a spring seat disc 8 to a holder generally indicated at 9. In holder 9 there is retained a valve member generally indicated at 10, formed of a valve disc 11 and a ball 12 rigidly secured (e.g. soldered) thereto. The valve member 10 and the valve seat 5 define together a cross-sectional area of a flow passage.

Turning now to FIG. 2, it is seen that the holder 9 substantially comprises a body 14 provided with a conical bore 13 for seating the ball 12 and a retaining disc 15 held in place by means of a snap-ring 16 disposed in a recess of body 14.

The retaining disc 15 maintains the ball 12 nested in the conical bore 13 by means of two outwardly bent tongues 15a which partially surround and engage the ball 12.

As seen in FIG. 3, the retaining disc 15 is provided with two eccentric openings 15b through which, during assembly, the ball 12 of the valve member 10 may be introduced and then shifted towards the center and snapped in place.

In the small bore 13a, which is a cylindrical, axially aligned continuation of the conical bore 13, there is disposed a spring element such as a coil spring 17 which urges the ball 12 out of the conical bore 13 and against the retaining disc 15. This arrangement prevents a hammering of valve disc 11 due to vibrations to which the pressure control valve is exposed during operation of the engine.

Spring seat disc 8, fixedly secured to holder 9, receives one end of a control spring 18 which forces the holder 9 and thus the valve member 10 towards valve seat 5. Stated in different terms, the control spring 18 urges the holder 9 in the direction of closing the cross-sectional area of the flow passage. The other end of spring 18 rests on a spring seat disc 19 which, in turn, is secured to an adjusting screw 20. The adjusting screw 20 is threadedly engaged in a bushing 21 secured to the frontal face of housing part 1a and is adapted to be locked by means of a nut 22. The spring seat disc 19 is centered by means of a pin 20a axially secured to and extending from the adjusting screw 20.

It is preferred that the ball 12 is held in bore 13 in such a manner that the center of the ball 12 is, with respect to the clamping plane defined by the area of attachment 23 of the membrane 7 to the holder 9, offset by a few teeths of one millimeter towards the valve seat 5. This arrangement ensures that tilting motions of the valve member 10 about the center of the ball 12 are possible without generating a substantial lateral displacing force against the holder 9. Further, when valve disc 11 is seated against the valve seat 5, it is preferred that the aforenoted clamping plane of the membrane 7 is, with respect to the clamping plane defined by the area of attachment 24 of membrane 7 to the housing 1, 1a, offset by a few tenths of one millimeter towards the valve seat 5. This ensures the compensating of a lateral thrust in case of a unilateral lifting of the valve disc 11.

The advantages achieved by the invention reside particularly in that the pressure in the fuel line (not shown) upstream of the control valve may be maintained very substantially constant even in case of a very small flow rate. There appear almost no pressure differences with increasing or decreasing flow rate (hysteresis): even after stoppage of the flow through the pressure control valve the constant pressure is continuously maintained since the cross-sectional area of the flow passage is very rapidly closed.

Further, the pressure control valve may be easily and simply assembled; in particular, there is no need of performing adjusting operations since, by means of the swivelably arranged valve member, a compensation for spring defect of centering error may take place automatically.

What is claimed is:

1. A pressure control valve of the type having a housing, a membrane secured within said housing and extending across the space enclosed thereby, a valve member affixed to said membrane, a stationary valve seat cooperating with said valve member and defining therewith a variable cross-sectional area of a flow passage, the area of said membrane being relatively large with respect to said cross-sectional area, the improvement comprising,
   (A) a holder secured to said membrane,
   (B) a valve member including
       (1) a valve disc cooperating with said valve seat,
       (2) a ball rigidly affixed to said valve disc and swivelably retained in said holder, and
   (C) resilient means urging said holder and said valve member as a unit towards said valve seat.

2. A pressure control valve as defined in claim 1, wherein the force of said resilient means is adjustable.

3. A pressure control valve as defined in claim 1, wherein the center of said ball is, with respect to a clamping plane defined by the area of attachment of said membrane to said holder, offset towards said valve seat.

4. A pressure control valve as defined in claim 1, wherein said membrane is secured to said housing and wherein, when said valve disc is in contact with said valve seat, the clamping plane defined by the area of attachment of said membrane to said holder is, with respect to the clamping plane defined by the area of attachment of said membrane to said housing, offset towards said valve seat.

5. A pressure control valve as defined in claim 1, wherein said holder includes
   (A) a body provided with a conical bore to receive said ball, and
   (B) a retaining disc secured to said body and adapted to maintain said ball nested in said conical bore.

6. A pressure control valve as defined in claim 5, wherein said retaining disc is secured to said body by means of a snap-ring disposed in an annular recess of said body adjacent said conical bore.

7. A pressure control valve as defined in claim 5, wherein said retaining disc includes a central opening through which said ball seated in said conical bore partially projects and two diametrically opposed tongues forming part of said opening and bent outwardly with respect to said conical bore, said tongues are in partial peripheral engagement with said ball.

8. A pressure control valve as defined in claim 7, wherein said retaining disc includes at least one eccentric opening through which said ball is adapted to pass.

9. A pressure control valve as defined in claim 5, including a spring element urging said ball out of said conical bore and against said retaining disc.

10. A pressure control valve as defined in claim 9, wherein said body is provided with a narrow cylindrical bore which is an axially aligned continuation of said conical bore, said spring element is a compression spring disposed in said cylindrical bore.

References Cited

UNITED STATES PATENTS 3,106,219  10/1963  Teston.

FOREIGN PATENTS 494,109  5/1919  France.

ARNOLD ROSENTHAL, Primary Examiner

U.S. Cl. X.R.

251—86